United States Patent [19]

Yamanaka et al.

[11] 4,055,846
[45] Oct. 25, 1977

[54] FILM CARTRIDGE ANTI-TILTING ARRANGEMENT

[75] Inventors: Akira Yamanaka, Sakai; Toshiaki Matsumoto, Toyokawa, both of Japan

[73] Assignee: Minolta Camera Kabushiki Kaisha, Osaka, Japan

[21] Appl. No.: 718,675

[22] Filed: Aug. 30, 1976

[30] Foreign Application Priority Data

Aug. 29, 1975 Japan .............................. 50-105267

[51] Int. Cl.² .......................... G03B 17/26; G03B 7/00
[52] U.S. Cl. ................................... 354/21; 352/78 C; 354/275
[58] Field of Search ............... 354/21, 58, 275, 160; 352/78 C, 72

[56] References Cited
U.S. PATENT DOCUMENTS

| 3,260,183 | 7/1966 | Winkler et al. | 352/72 X |
| 3,613,535 | 10/1971 | Hirabayashi | 354/21 |
| 4,000,497 | 12/1976 | Galbraith, Jr. | 354/21 |

Primary Examiner—Edna M. O'Connor

[57] ABSTRACT

A camera has a cover member for opening and closing a film cartridge-retaining chamber, and a detecting member movable to effect automatic setting of the film sensitivity or automatic change-over of a filter. The film cartridge has a signal element on its side wall of a predetermined size which may be engaged by the detecting member when the film cartridge is charged into the camera for effecting the automatic setting of the film sensitivity or of the automatic change-over of a filter. After the detecting member has engaged the signal element, and thus tends to tilt the film cartridge, the detecting member is moved in a direction away from the signal element due to a closing operation of the cover member, or the detecting member is released from a force which urges the detecting member toward the signal element, thereby eliminating the influence of the force acting to tilt the film cartridge.

9 Claims, 9 Drawing Figures

FILM CARTRIDGE ANTI-TILTING ARRANGEMENT

BACKGROUND OF THE INVENTION

This invention relates generally to a camera using a film cartridge, and more particularly to a device for preventing tilting of the film cartridge in the camera.

An automatic film-sensitivity setting device and an automatic filter change-over device have been proposed as means for detecting a signal from a film cartridge to automatically operate some type of camera component. With the device of the type described, a signal element is provided as a signal detecting means on a film cartridge, while a detecting member which is urged so as to engage the signal member is provided in the camera, whereby upon charging the film cartridge into the camera, the detecting member is brought into engagement with the signal element to detect a signal.

However, with the aforesaid arrangement, the detecting member maintains its biasing force on the cartridge so as to thereby possibly cause the film cartridge to tilt.

In other words, when the film cartridge is fixed in position, it is urged toward the side of an aperture by means of a pressure plate provided on a back cover, after being charged in the camera. A relatively weak spring force is therefore provided for the pressure plate because of the strength of the film cartridge and the light-shielding requirement for a cartridge retaining chamber of the camera, while much stronger spring force is exerted on the detecting member for operating components such as a film sensitivity setting member, a filter and the like, accurately and rapidly. Accordingly, the spring force of the detecting member overcomes the spring force of the pressure plate, thereby tilting the film cartridge when charged into the camera.

Therefore, the spring force may tilt the cartridge back and forth along the optical axis of the camera relative to an exposure plane thereby resulting in an unclear or defocused portion in part of an image on the film due to an improper back focal distance. In addition, if the cartridge tilts in a vertical direction of a camera (in a direction describing a circle around the optical axis), an image results which tilts relative to a frame of the film.

SUMMARY OF THE INVENTION

It is an object of the present invention to provide a device for preventing tilting of a film cartridge, after the film cartridge has been charged into a camera, thereby providing an image on the film in a proper position relative thereto, i.e., without tilting the image relative to the film, yet providing a sharply focused image over the entire surface of the film.

It is another object of the present invention to provide such a device for preventing tilting of the film cartridge, which device avoids the need for a spring force acting on the film cartridge to tilt same, thereby eliminating an unwanted force which is acting on the wall of a cartridge-retaining chamber through the medium of the cartridge, and thereby insuring an improved light-shielding function of the chamber, and preventing leakage of light, i.e., an unused film from its sensing the light.

It is a further object of the present invention to provide such a device wherein the tilting preventing operation of the cartridge may be automatically effected due to a closing operation of a cover member upon charging of the cartridge into the camera, thereby preventing an erroneous operation and eliminating an unwanted force acting on the cartridge.

It is a still further object of the present invention to provide such a device for preventing tilting of the film cartridge, which device is relatively simple in construction, is economical to manufacture, and provides a wide range of design freedom.

According to the present invention, a device for preventing tilting of a film cartridge is provided wherein after charging of the film cartridge into the camera, a detecting member is moved in a direction away from a signal element of the film cartridge, thereby eliminating a force of a detecting member acting on the film cartridge.

Other objects, advantages and novel features of the invention will become more apparent from the detail description of the invention when taken in conjunction with the accompanying drawings.

DESCRIPTION OF THE PREFERRED EMBODIMENT

Figure 1:
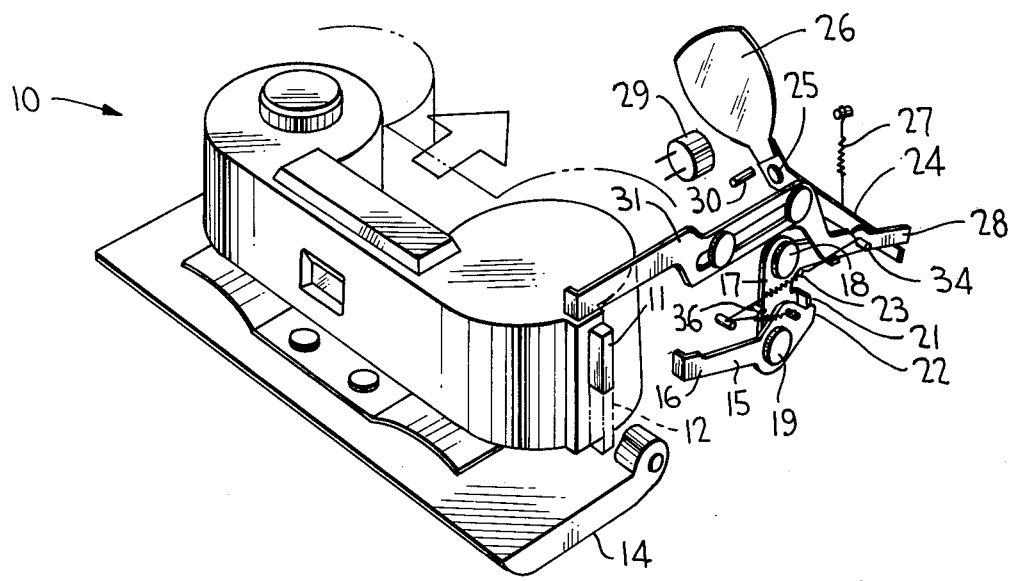
FIG. 1 is a perspective view illustrating one embodiment of the device of the present invention.

A typical film cartridge generally designated 10 in FIG. 1 has a signal element 11 located on a side wall thereof. For a cartridge containing a high sensitivity film, element 11 is of a length shown in solid outline, and of a longer length shown further at 12 in phantom outline for a cartridge containing a low sensitivity film. Camera body 13 (partially shown in FIGS. 2 to 4) into which the cartridge is charged in a direction of the arrow of FIG. 1 until it reaches its position shown in phantom outline therein, has a hinged back cover 14 which is adapted for use with both a high sensitivity film and a low sensitivity film.

Mounted within the camera body is a detecting member 15 for detecting sensitivity of the film, member 15 having a detecting arm 16 adapted to be moved into the space occupying portion 12 of the signal element. A control lever 17 is pivotally mounted at 18 on a stationary portion of camera body 13, detecting member 15 being pivotally mounted as at 19 to a free end of the control lever. Stop elements 21, 22, respectively on member 15 and lever 17, are interengageable so that lever 17 is resiliently urged into a clockwise direction of movement by means of a coil spring 23 mounted at one end of member 15 and at its opposite end on a stationary portion of the camera body. A sensitivity setting member 24 is pivotaly mounted as at 25 to the camera body, and has a light controlling member 26, comprising an ND filter or the like, mounted thereon. Member 24 is resiliently urged for pivotal movement into a counterclockwise direction by a spring 27 mounted at one end to the camera body, and an end 28 of lever 17 engages member 24 for preventing such counterclockwise movement thereof so as to thereby maintain member 26 away from the optical path of a light receiving member 29. A release lever 31 is mounted on the camera body above lever 17 for sliding movement from left to right when viewing FIGS. 2 to 5, and is constrained by pins 32 extending through elongated slot 33. A pin 34 is positioned on end 28 and lies sightly below cam surface 35 of lever 31 before being moved into its position of FIG. 2 to be described hereinafter. Lever 31 is resiliently urged for movement to the left (FIG. 2) by a spring 36 connecting it to the camera body. Arm 37 of lever 31 extends outwardly of the camera body so that, when cover 14 is closed, lever 31 is moved to the right as in FIG. 3.

Figure 2:
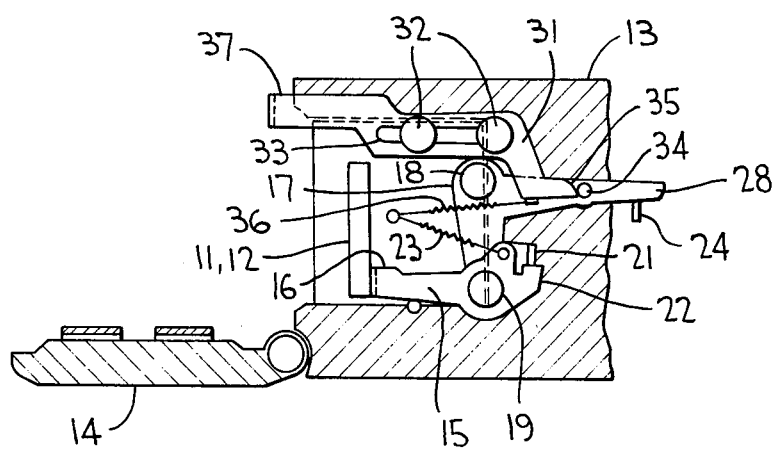
FIG. 2 is a cross-sectional view of an essential part of the device of FIG. 1 showing a condition wherein a low sensitivity film cartridge is charged into the camera.
Figure 3:
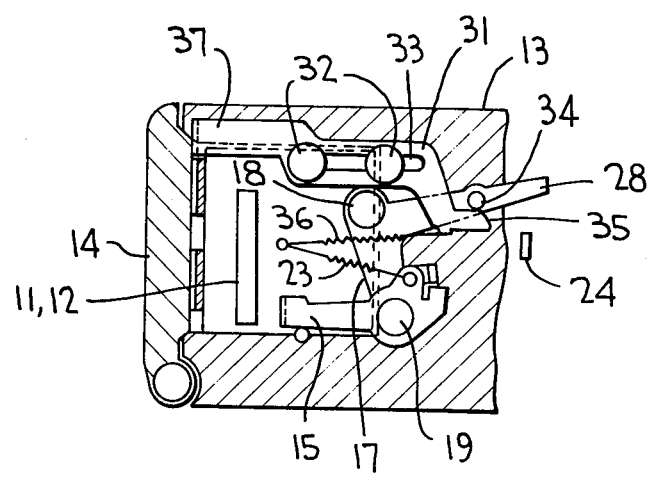
FIG. 3 is a view similar to FIG. 2, showing the final step of charging the cartridge into the camera.

Operation of the above arrangement will be described for the charging of a cartridge containing a low sensitivity film, the cartridge therefore having a signal element with portions 11 and 12. When the cartridge containing a low sensitivity film is inserted into the camera, the signal element thereof bears against arm 16 of detecting member 15 so as to push same to the right when viewing FIG. 2. Such movement of detecting member 15 effects rotation of control lever 17 in a counterclockwise direction to a predetermined extent, thereby releasing sensitivity setting member 24 from its locked condition so as to allow member 24 to likewise rotate counterclockwise to a predetermined extent. This causes light controlling member 26 to move into the optical path of an incident light for light receiving member 29, thereby setting the sensitivity for the low sensitivity film. And simultaneously therewith, the counterclockwise rotation of control lever 17 causes pin 34 to be moved into a contact position with cam surface 35 of release lever 31 as shown in FIG. 2. In this condition, the force of spring 23 connected to detecting member 15 acts on the signal element of the cartridge, thereby exerting an unwanted force on the cartridge outwardly of the camera. At this time, when back cover 14 is closed, it causes arm 37 of release lever 31 to be pushed inwardly to the right as shown in FIG. 3. This causes cam surface 35 formed on the tip portion of release lever 31 to engage pin 23 to move the same upwardly, thereby rotating control lever 17 counterclockwise to a slight extent. Since detecting member 15 is pivotally connected to one end of lever 17, counterclockwise rotation of lever 17 moves member 15 inwardly to the right, whereupon arm 16 is moved away from the signal element. As a result, the force of spring 23, which had been exerted on the film cartridge via contact between arm 16 and the signal element, is removed completely therefrom as clearly shown in FIG. 3. At this time, sensitivity setting member 24 is further prevented from rotating counterclockwise by means of a locking pin 30 mounted on the camera, so that member 24 no longer bears against the counterclockwise rotated control lever 17, thereby maintaining light control member 26 in the front of light receiving element 29.

Figure 4:
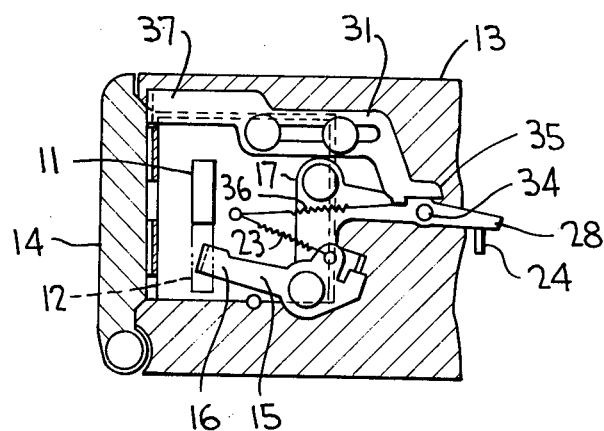
FIG. 4 is a view similar to FIG. 2, showing a condition wherein a high sensitivity film cartridge is charged into the camera.

When a cartridge containing a high sensitivity film is charged into the camera, detecting arm 16 of detecting member 15 will be positioned within portion 12 of the signal element which forms no part of the signal element as described earlier and as clearly illustrated in FIG. 4. Since portion 11 of the signal element does not contact arm 16, member 15, lever 17 and member 24 are maintained in their unmoved positions as illustrated in FIG. 1, so that light control member 26 is positioned out of the optical path of incident light for light receiving member 29, whereby the sensitivity for the high sensitivity film is set for light receiving element 29. And since detecting member 15 is maintained out of contact with the cartridge, no force is thereby exerted against the cartridge. Closing of back cover 14 effects a sliding movement of release lever 31 to the right similarly as described in the first embodiment. And since pin 34 lies sightly below cam surface 35 as described earlier for FIG. 1 and as shown in FIG. 4, and control lever 17 remains stationary, pin 34 remains out of contact with cam surface 35, so that the cam surface will not engage pin 34 but will pass thereover during sliding movement of lever 31.

Figure 5:
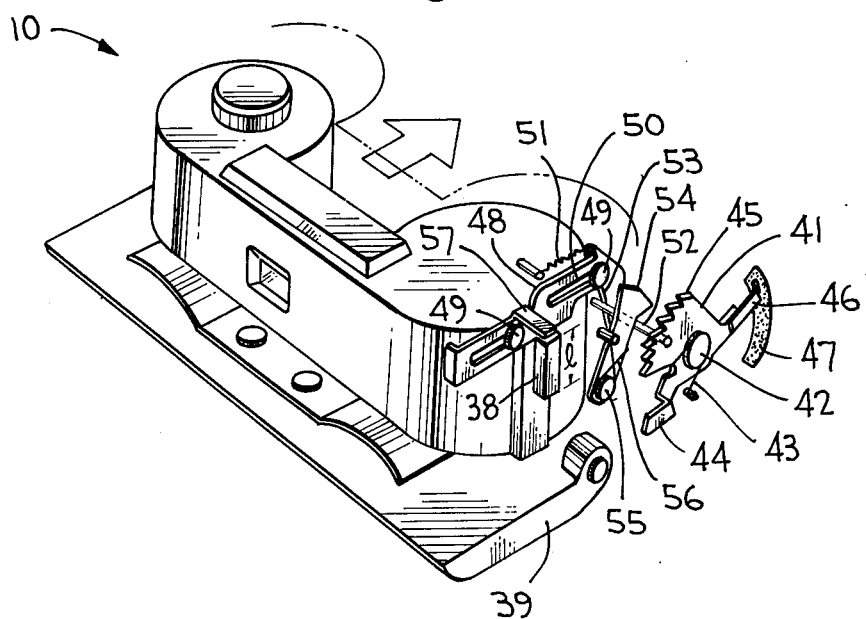
FIG. 5 is a perspective view of another embodiment of the device of the present invention.

A second embodiment of the present invention is shown in FIG. 5 wherein film cartridge 10 is provided with a signal element 38 on a side wall thereof similarly as in FIG. 1 except that element 38 has a length l which varies depending on the sensitivity of the film contained within the cartridge. The film cartridge is charged similarly as in FIG. 1 as it is shifted in the direction of the FIG. 5 arrow to its position shown in phantom outline. The camera, not otherwise shown, has a back cover 39 hingedly connected thereto. A film sensitivity detecting member 41 is pivotally mounted as at 42 on the camera body and is resiliently urged for movement in a clockwise direction by means of coil spring 43 connecting member 41 with the camera body. The detecting member has an arm 44 thereon as well as a saw tooth portion 45, arm 44 being positioned below signal element 38, similarly as in FIG. 4, when the cartridge is charged into the camera. The detecting member is also provided with a sensitivity setting member 46 comprising a plate element fixed thereon for movement together with member 41 so as to slide relative to a variable resistor 47 fixed on the camera body. Member 46 is therefore adapted for determining the resistance for resistor 47 for setting a known film sensitivity.

Figure 6:
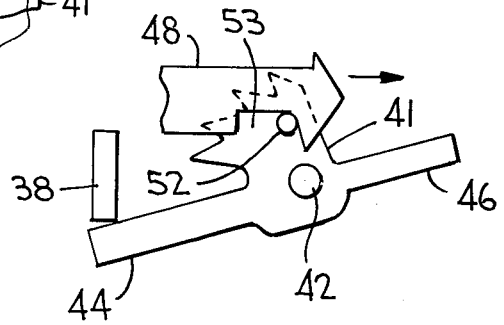
FIG. 6 is a detail view of the FIG. 5 arrangement showing operation of the detecting member upon partially closing the back cover of the camera.

A release lever 48 is mounted on the camera, similarly as in FIG. 2, for sliding movement as by means of pins 49 extending through elongated slots 50. A coil spring 51 resiliently urges lever 48 forwardly opposite in direction to the FIG. 5 arrow. Similarly as described for lever 31 of the first embodiment, lever 48 is adapted to be slidingly moved in the direction of the FIG. 5 arrow by means of cover 39 when it is closed as in FIGS. 3 and 4. A locking pin 52 mounted on member 41 extends into the path of lever 48 for contact engagement with a forward edge of notch 53 provided in lever 48 so as to prevent member 41 from rotating clockwise. When lever 48 is moved to the right in FIG. 5, pin 52 remains biased against the forward edge of notch 53, by reason of spring 43, so as to be carried rearwardly therewith. Member 41 is thereby permitted to rotate clockwise as shown in FIG. 6.

A control lever 54 is pivotally mounted as at 55 on the camera body and is resiliently urged into a counterclockwise movement by a spring 56 connected to the camera body. Lever 54 is coplanar with member 41 and, as will be explained hereinafter, lever 54 is adapted to release the spring force of the clockwise rotated member 41 from acting on the cartridge. Such is effected as the release lever engages a tooth of saw-tooth portion 45 of the detecting member as lever 54 is engaged by an arm 57 on lever 48 so as to rotate lever 54 clockwise. Member 41 is accordingly rotated counterclockwise.

In operation, when film cartridge 10 of FIG. 5 is charged into the camera, and back cover 39 is partially closed so as to contact control lever 48 in the course of its closing, the control lever is slidingly moved inwardly to the right to a slight extent in the direction of the arrow of FIG. 5. Such sliding movement on the control lever causes pin 52 which is seated on forward edge of notch 53 to shift in the direction to engage with notch 53 thereby permitting member 41 to rotate clockwise under the action of its spring 43. Such clockwise rotation of the detecting member continues until detecting arm 44 thereon is moved upwardly into contact with the lower end of signal element 38 on the cartridge (see FIG. 6). At this time, an extent of movement of sensitivity setting member 46, provided on detecting member 41, temporarily sets the film sensitivity with the aid of variable resistor 47. In the condition of FIG. 6, an upward force is exerted on the film cartridge, due to the clockwise rotating force of detecting member 41.

Figure 7:
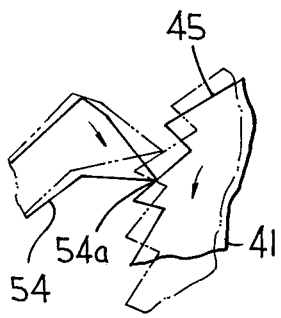
FIG. 7 is an enlarged side view of an essential part of the FIG. 5 device showing its operating condition.

An arm 57 is provided on release lever 48 and extends into the path of control lever 54. Arm 57 is likewise so spaced from lever 54 as not to make contact therewith upon the initial closing of cover 39 which causes clockwise rotation of member 41 as aforedescribed. However, arm 57 is spaced from lever 54 so as to make contact therewith and to rotate same clockwise upon a full closing of cover 39, similarly shown fully closed in FIGS. 3 and 4, which causes lever 48 to be further shifted to the right. Upon such clockwise rotation of lever 54, its pointed tip 54a contacts one of the teeth of portion 45 so as to thereby rotate detecting member 41 slightly counterclockwise from its position shown in phantom outline in FIG. 7 to its position shown in solid outline therein. Arm 44 is accordingly moved downwardly away from signal element 38, so that the upward force which had been exerted on the cartridge is now completely removed. The sensitivity setting member 46 is likewise shifted counterclockwise, although it produces a risk that the resistance value set for the variable resistor may be thereby varied. In order to avoid such a risk, however, the extent of movement of member 46 should be added to a set resistance value beforehand so as to provide a predetermined resistance value when member 41 is rotated counterclockwise. For this reason the resistance value should be set temporarily, as described earlier.

Figure 8:
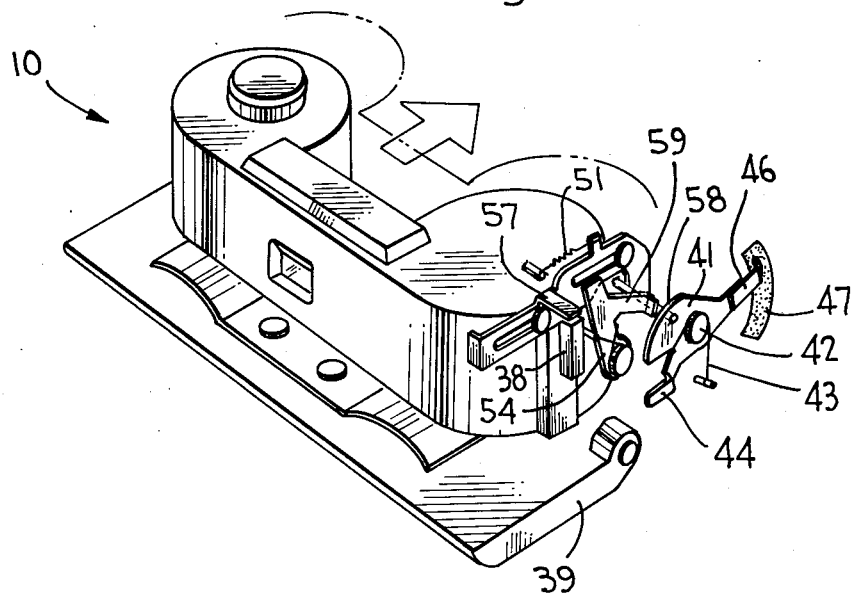
FIG. 8 is a perspective view showing still another embodiment of the device of the present invention.

As an alternative to the aforedescribed approach in effecting counterclockwise rotation of detecting member 41 after its arm 44 has contacted signal element 38, a cam surface 58 may be provided on member 41, as shown in FIG. 8, in lieu of saw tooth portion 45. And a cam engaging arm 59 is provided on release lever 54 for engagement with surface 58 upon clockwise movement of the release lever similarly as aforedescribed. The cam surface is therefore forced downwardly so as to rotate member 41 counterclockwise.

Figure 9:
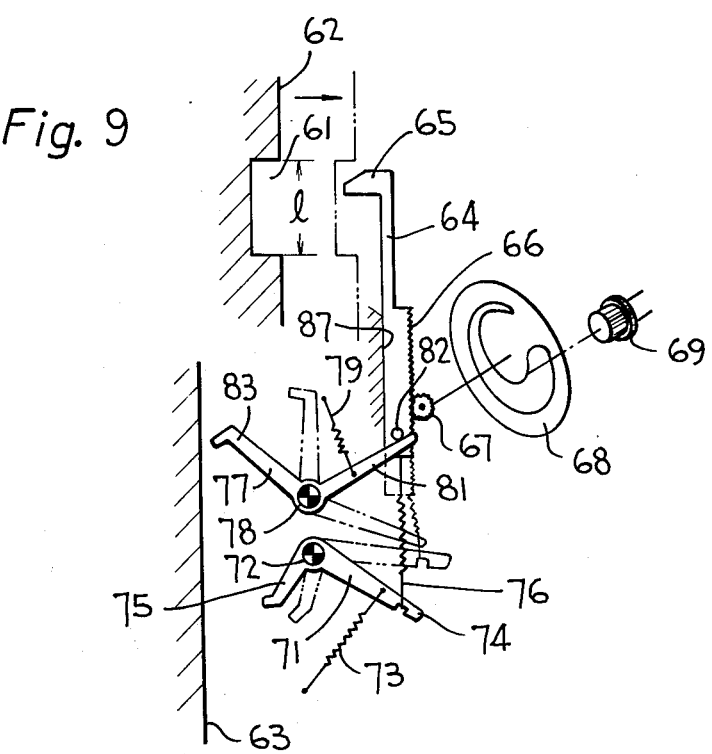
FIG. 9 is a side view of a construction of a yet another embodiment of the invention.

FIG. 9 illustrates another embodiment of the device according to the present invention as applied to a movie camera. A signal portion 61 is defined by a recess and has a length l which may be varied depending on varying film sensitivities, and is defined in the wall of a film cartridge 62. A back cover is shown at 63 which may be opened or closed and defines a cartridge retaining chamber. A detecting member 64, adapted for vertical reciprocation, has a hooked detecting arm 65. A rack portion 66 on member 64 engages the teeth of a pinion gear 67 which is mounted on a sensitivity setting member 68 for rotation therewith. Thus upon reciprocation of member 64, member 68 is rotated to control an amount of incident light to a light receiving element 69.

A release lever 71 is mounted on the camera body for pivotal movement as at 72, and is resiliently urged for clockwise rotation by a spring 73 interconnecting an arm 74 of the lever with the camera body. Arm 74 extends outwardly of the camera body for engagement with back cover 63 and is adapted for counterclockwise rotation only when back cover 63 engages arm 75 of lever 71, upon closure of the cover. A spring 76 which is weaker than spring 73 connects arm 74 of lever 71 with detecting member 64, thus pulling the detecting member downwardly.

A control lever 77 is likewise pivotally mounted to the camera body as at 78 and is resiliently urged for counterclockwise rotation by means of a spring 79, which is stronger than spring 73, interconnecting an arm 81 of lever 77 with the camera body. Arm 81 is thus urged into engagement with a stop pin 82 provided on member 64 so as to thereby bias member 64 against downward movement. And arm 83 of lever 77 extends outwardly of the camera body so as to be engaged by back cover 63, lever 77 thereby being rotated clockwise against the force of spring 79 when the back cover is closed. Both control lever 77 and release lever 71 are rotated against the forces acting thereon, due to the closure of the back cover, in such a manner that control lever 77 is first rotated, followed by rotation of release lever 71.

The FIG. 9 arrangement will now be described. Film cartridge 62 is inserted into the camera (not shown) to the position illustrated in phantom outline, thereby effecting engagement between arm 65 and signal portion 61 formed on the wall of the cartridge. Back cover 63 is then closed. However, in the course of such closing operation, back cover 63 first contacts control lever 77 so as to rotate same in a clockwise direction against the force of spring 79. Such rotation of the control lever releases detecting member 64 from its locked position of FIG. 9 so that the detecting member is lowered by means of spring 76, thereby bringing hooked detecting arm 65 into engagement with the lower edge of signal portion 61. And while the detecting member is being lowered, rack portin 66 thereof rotates sensitivity setting member 68 through the medium of pinion 67, thereby controlling an amount of incident light into light receiving element 69, thus setting a film sensitivity which may be varied by increasing the length l of signal portion 61. Under this condition, the force of spring 76 acts on the film cartridge so as to tilt same downwardly. And as back cover 63 is closed to a further extent, it contacts arm 75 of releasing lever 71, immediately before it reaches the normal closed position, so as to thereby rotate same counterclockwise against the force of spring 73. The counterclockwise rotation of release lever 71 causes spring 76 to be compressed, so as to thereby release its force acting on the cartridge.

Meanwhile, if a suitable friction prevails between the detecting member 64 and a surface 87 of a body, then the movement of the detecting member 65 after setting of sensitivity may be prevented, so that the detecting member 64 may be maintained in a given position. This therefore obviates the need for changing the set position of sensitivity setting member 68.

Obviously, many other modifications and variations of the present invention are made possible in the light of the prior art. It is therefore to be understood that within the scope of the appended claims the invention may be practiced otherwise than as specifically described.

What is claimed is:

1. A camera having a chamber open at one end for the reception of a film cartridge, a cover mounted on the camera for closing said open end of said chamber, an arrangement on said camera operable upon the closing of said cover for avoiding any tilting of the cartridge upon insertion thereof into said chamber and for controlling an exposure condition of the camera depending on the species of the film such as the film sensitivity contained within the cartridge which has on a side wall thereof a signal element of a selected size corresponding with the species of the film, said arrangement comprising:
   a movable detecting member extending toward said open end;
   spring means on the camera urging said detecting member for movement toward said open end;
   an adjusting member mounted for movement together with said detecting member for controlling an exposure condition of the camera; and
   release means for actuating said detecting member for movement thereof against the force of said spring means away from said open end upon the closing of said cover, said release means including a release lever extending partly outwardly of said open end and being mounted for movement away from said open end upon the closing of said cover; whereby any tilting of the cartridge inserted within said chamber is avoided by the release of the force of said spring means acting against the signal element having a predetermined size causing it to bear againt said detecting member.

2. The camera according to claim 1, wherein said release means further includes a pivotally mounted control lever coupled with said detecting member, said release lever having a cam surface thereon engageable with said control lever for actuating movement of said detecting member away from said open end upon the closing of said cover.

3. The camera according to claim 2, wherein said release lever is mounted for rectilinear movement and another spring means on the camera urges it toward said open end, said detecting member being mounted for rectilinear movement.

4. The camera according to claim 2, wherein said adjusting member is mounted for pivotal movement, and said control lever has an arm bearing against said adjusting member for controlling the movement thereof.

5. The camera according to claim 1, wherein said detecting member is mounted for pivotal movement and is engaged with said release lever for movement toward said open end as said release lever moves away from said open end.

6. The camera according to claim 5, wherein said release means further includes a control lever mounted for pivotal movement toward said detecting member for engagement therewith so as to move said detecting member away from said open end, an arm on said release lever bearing against said control lever for movement thereof as said release lever is moved away from said open end.

7. The camera according to claim 6, wherein said detecting member has a toothed portion for engagement with a tooth provided on said control lever.

8. The camera according to claim 6, wherein said detecting member has a cam surface engageable by an arm provided on said control lever.

9. The camera according to claim 6, wherein said adjusting member is connected to said detecting member.

* * * * *